US009188085B2

(12) United States Patent
Fiveland et al.

(10) Patent No.: US 9,188,085 B2
(45) Date of Patent: Nov. 17, 2015

(54) FUEL SYSTEM HAVING MULTIPLE GASEOUS FUEL INJECTORS

(71) Applicant: Electro-Motive Diesel, Inc., La Grange, IL (US)

(72) Inventors: Scott B. Fiveland, Metamora, IL (US); David T. Montgomery, Edelstein, IL (US); Aaron G. Foege, Westmont (IL); Deep Bandyopadhyay, Naperville, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 439 days.

(21) Appl. No.: 13/665,727

(22) Filed: Oct. 31, 2012

(65) Prior Publication Data

US 2014/0116386 A1 May 1, 2014

(51) Int. Cl.
*F02M 21/02* (2006.01)
*F02D 19/06* (2006.01)

(52) U.S. Cl.
CPC ....... *F02M 21/0284* (2013.01); *F02D 19/0642* (2013.01); *F02D 19/0689* (2013.01); *F02M 21/0245* (2013.01); *F02M 21/0248* (2013.01); *Y02T 10/32* (2013.01); *Y02T 10/36* (2013.01)

(58) Field of Classification Search
CPC ....... Y02T 10/32; Y02T 10/36; Y02T 10/125; Y02T 10/123; Y02T 10/44; F02B 3/06; F02B 1/04; F02B 43/00; F02B 19/1004; F02B 2075/025; F02B 2075/125; F02B 2275/14; F02D 41/0027; F02D 19/0692; F02D 41/30; F02D 41/0025; F02D 41/3094; F02D 41/40; F02D 41/402; F02D 19/081; F02D 41/182; F02D 19/08

USPC ........... 123/525–527, 575–578, 304, 305, 73, 123/74; 701/102–105
See application file for complete search history.

(56) References Cited

U.S. PATENT DOCUMENTS

| 946,406 | A | | 1/1910 | Söhnlein | |
|---|---|---|---|---|---|
| 1,750,571 | A | * | 3/1930 | Chorlton | 123/275 |
| 2,267,333 | A | | 12/1941 | Jacoby et al. | |
| 2,367,029 | A | | 1/1945 | Jameson | |
| 2,686,503 | A | | 8/1954 | Reddy et al. | |
| 2,767,692 | A | * | 10/1956 | Barber | 123/301 |
| 3,924,598 | A | * | 12/1975 | Davis | 123/306 |
| 4,088,098 | A | | 5/1978 | Rose et al. | |
| 4,091,772 | A | | 5/1978 | Heater et al. | |
| 4,473,046 | A | * | 9/1984 | Aoyama et al. | 123/279 |
| 4,527,516 | A | | 7/1985 | Foster | |

(Continued)

FOREIGN PATENT DOCUMENTS

EP 0432153 B1 6/1991
EP 2441941 A2 4/2012

(Continued)

*Primary Examiner* — Thomas Moulis
*Assistant Examiner* — Joseph Dallo
(74) *Attorney, Agent, or Firm* — Finnegan, Henderson, Farabow, Garrett & Dunner, LLP (57) ABSTRACT

A fuel system for an engine is disclosed. The fuel system may have a first fuel injector configured to inject a first stream of gaseous fuel radially into a combustion chamber of a cylinder of the engine through a first air intake port. The fuel system may also have a second fuel injector configured to inject a second stream of gaseous fuel radially into the combustion chamber through a second air intake port to collide with the first stream of gaseous fuel.

20 Claims, 5 Drawing Sheets

(56) References Cited

U.S. PATENT DOCUMENTS

| | | | |
|---|---|---|---|
| 4,579,093 A | 4/1986 | Eanes | |
| 4,679,538 A | 7/1987 | Foster | |
| 4,924,828 A * | 5/1990 | Oppenheim | 123/299 |
| 4,957,089 A | 9/1990 | Morikawa | |
| 4,974,571 A * | 12/1990 | Oppenheim et al. | 123/531 |
| 5,035,206 A | 7/1991 | Welch et al. | |
| 5,251,580 A | 10/1993 | Torigai | |
| 5,271,357 A | 12/1993 | Hsu et al. | |
| 5,271,365 A * | 12/1993 | Oppenheim et al. | 123/256 |
| 5,357,919 A | 10/1994 | Ma | |
| 5,517,954 A | 5/1996 | Melchior | |
| 5,546,908 A * | 8/1996 | Stokes | 123/480 |
| 5,588,402 A | 12/1996 | Lawrence | |
| 5,720,254 A * | 2/1998 | Yoshida et al. | 123/305 |
| 5,762,040 A * | 6/1998 | Taipale et al. | 123/299 |
| 5,950,596 A * | 9/1999 | Kollmann | 123/298 |
| 6,035,825 A * | 3/2000 | Worth et al. | 123/357 |
| 6,125,817 A * | 10/2000 | Piock et al. | 123/301 |
| 6,240,892 B1 | 6/2001 | Sweeney | |
| 6,318,344 B1 | 11/2001 | Lucier et al. | |
| 6,341,592 B2 * | 1/2002 | Okamoto et al. | 123/305 |
| 6,467,465 B1 * | 10/2002 | Lorts | 123/527 |
| 6,523,529 B1 | 2/2003 | Moncelle | |
| 6,609,499 B2 * | 8/2003 | Kabat et al. | 123/432 |
| 6,640,792 B2 | 11/2003 | Harvey et al. | |
| 6,675,748 B2 | 1/2004 | Ancimer et al. | |
| 6,935,578 B1 * | 8/2005 | Shibata et al. | 239/463 |
| 7,019,626 B1 * | 3/2006 | Funk | 340/438 |
| 7,021,558 B2 | 4/2006 | Chenanda et al. | |
| 7,028,918 B2 | 4/2006 | Buchanan et al. | |
| 7,082,921 B2 * | 8/2006 | Shimizu et al. | 123/305 |
| 7,090,145 B2 | 8/2006 | Baker et al. | |
| 7,093,588 B2 * | 8/2006 | Edwards | 123/525 |
| 7,117,830 B1 * | 10/2006 | Boyer et al. | 123/90.15 |
| 7,168,241 B2 | 1/2007 | Rudelt et al. | |
| 7,207,321 B2 | 4/2007 | Vadimovitch et al. | |
| 7,225,793 B2 | 6/2007 | Schwulst et al. | |
| 7,264,181 B2 * | 9/2007 | Abe et al. | 239/533.2 |
| 7,270,089 B2 * | 9/2007 | Wong | 123/27 GE |
| 7,343,895 B2 | 3/2008 | Mark | |
| 7,481,048 B2 | 1/2009 | Harmon et al. | |
| 7,938,103 B2 * | 5/2011 | Keays | 123/536 |
| 8,051,830 B2 | 11/2011 | Taylor | |
| 8,056,326 B2 | 11/2011 | Cox et al. | |
| 2003/0084877 A1 * | 5/2003 | Kabat et al. | 123/432 |
| 2004/0149255 A1 | 8/2004 | zur Loye et al. | |
| 2005/0081820 A1 * | 4/2005 | Tanaka et al. | 123/295 |
| 2007/0256648 A1 * | 11/2007 | Sun et al. | 123/1 A |
| 2009/0012698 A1 * | 1/2009 | Shinagawa et al. | 701/103 |
| 2009/0084346 A1 | 4/2009 | Zhou et al. | |
| 2010/0175660 A1 * | 7/2010 | Nishimoto et al. | 123/305 |
| 2012/0073264 A1 | 3/2012 | Li et al. | |
| 2012/0085326 A1 * | 4/2012 | Mo et al. | 123/526 |
| 2012/0132174 A1 * | 5/2012 | Boyer et al. | 123/305 |
| 2013/0133624 A1 * | 5/2013 | Hirose et al. | 123/478 |
| 2013/0174563 A1 * | 7/2013 | Boardman et al. | 60/772 |
| 2013/0174814 A1 * | 7/2013 | Sugiyama | 123/525 |
| 2013/0255646 A1 * | 10/2013 | Ulrey et al. | 123/527 |
| 2014/0331970 A1 * | 11/2014 | Bidner et al. | 123/435 |

FOREIGN PATENT DOCUMENTS

| | | |
|---|---|---|
| JP | 5202756 A | 8/1993 |
| WO | WO 2011/002351 A1 | 1/2011 |
| WO | WO 2011/002353 A1 | 1/2011 |
| WO | WO 2011/139932 A1 | 11/2011 |
| WO | WO 2013183737 A1 * | 12/2013 |

* cited by examiner

FUEL SYSTEM HAVING MULTIPLE GASEOUS FUEL INJECTORS

TECHNICAL FIELD

The present disclosure is directed to a fuel system and, more particularly, to a fuel system having multiple gaseous fuel injectors for each cylinder of an associated engine.

BACKGROUND

Due to the rising cost of liquid fuel (e.g. diesel fuel) and ever increasing restrictions on exhaust emissions, engine manufacturers have developed dual-fuel engines. An exemplary dual-fuel engine provides injections of a low-cost gaseous fuel (e.g. natural gas) through air intake ports of the engine's cylinders. The gaseous fuel is introduced with clean air that enters through the intake ports and is ignited by liquid fuel that is injected during each combustion cycle. Because a lower-cost fuel is used together with liquid fuel, cost efficiency may be improved. In addition, the combustion of the gaseous and liquid fuel mixture may result in a reduction of harmful emissions.

An exemplary dual fuel engine is disclosed in U.S. Pat. No. 5,035,206 that issued to Welch et al. on Jul. 30, 1991. In particular, the '206 patent discloses a dual-fuel engine having an engine cylinder with a gaseous fuel injector for injecting natural gas into the combustion chamber to mix with separately-injected diesel fuel. The gaseous fuel injector includes a delivery conduit mounted at a location above cylinder intake ports. This location above the intake ports may allow for injection of the gaseous fuel later in the cycle, such as after the intake ports have been closed by the piston.

While the dual-fuel engine of the '206 patent may result in lower operating costs and/or exhaust emissions, it may be less than ideal. In particular, it may be possible for fuel that is injected while the intake ports are open to escape through another one of the ports. Further, injecting fuel after the intake ports are closed may result in inefficient mixing of the fuel and intake air. Also, in order to install the delivery conduit above the intake ports, modification of the cylinder may be necessary to include an aperture that accommodates the conduit. This extra fabrication step may reduce retrofit applicability.

The disclosed fuel system is directed to overcoming one or more of the problems set forth above and/or other problems of the prior art.

SUMMARY

In one aspect, the present disclosure is directed to a fuel system for an engine. The fuel system may include a first fuel injector configured to inject a first stream of gaseous fuel radially into a combustion chamber of a cylinder of the engine through a first air intake port. The fuel system may also include a second fuel injector configured to inject a second stream of gaseous fuel radially into the combustion chamber through a second air intake port to collide with the first stream of gaseous fuel.

In another aspect, the present disclosure is directed to a method of injecting fuel into an engine. The method may include injecting a first stream of gaseous fuel radially into a combustion chamber through one of a plurality of intake ports in a cylinder of the engine. The method may also include injecting a second stream of gaseous fuel radially into the combustion chamber through another of the plurality of intake ports to collide with the first stream of gaseous fuel.

DETAILED DESCRIPTION

Figure 1:
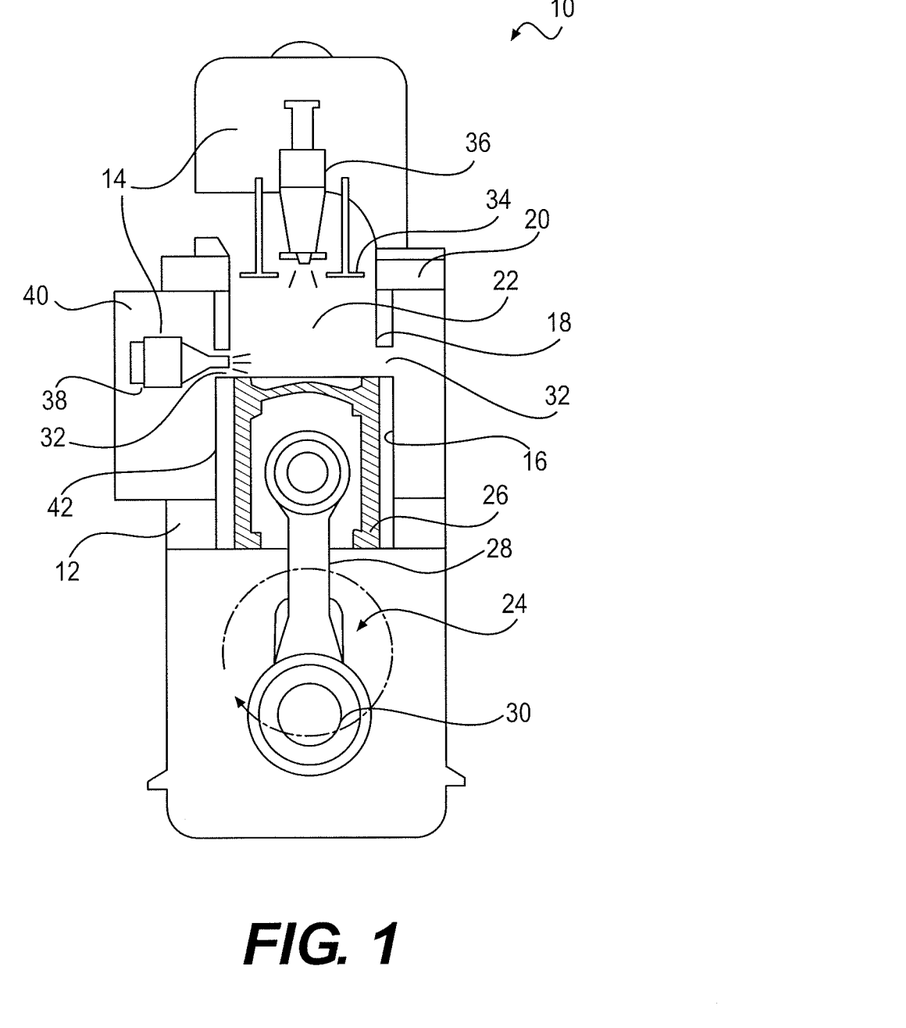
FIG. 1 is a cross-sectional illustration of a dual-fuel engine equipped with an exemplary disclosed fuel system.

FIG. 1 illustrates an exemplary internal combustion engine 10. Engine 10 is depicted and described as a two-stroke dual-fuel engine. Engine 10 may include an engine block 12 that at least partially defines a plurality of cylinders 16 (only one shown), each having an associated cylinder head 20. A cylinder liner 18 may be disposed within each engine cylinder 16, and cylinder head 20 may close off an end of liner 18. A piston 24 may be slidably disposed within each cylinder liner 18. Each cylinder liner 18, cylinder head 20, and piston 24 may together define a combustion chamber 22 that receives fuel from a fuel system 14 mounted to engine 10. It is contemplated that engine 10 may include any number of engine cylinders 16 with corresponding combustion chambers 22.

Within engine cylinder liner 18, piston 24 may be configured to reciprocate between a bottom-dead-center (BDC) or lower-most position, and a top-dead-center (TDC) or upper-most position. In particular, piston 24 may be an assembly that includes a piston crown 26 pivotally connected to a rod 28, which may in turn be pivotally connected to a crankshaft 30. Crankshaft 30 of engine 10 may be rotatably disposed within engine block 12 and each piston 24 coupled to crankshaft 30 by rod 28 so that a sliding motion of each piston 24 within liner 18 results in a rotation of crankshaft 30. Similarly, a rotation of crankshaft 30 may result in a sliding motion of piston 24. As crankshaft 30 rotates through about 180 degrees, piston crown 26 and connected rod 28 may move through one full stroke between BDC and TDC. Engine 10, being a two-stroke engine, may have a complete cycle that includes a power/exhaust/intake stroke (TDC to BDC) and an intake/compression stroke (BDC to TDC).

During a final phase of the power/exhaust/intake stroke described above, air may be drawn into combustion chamber 22 via one or more gas exchange ports (e.g., air intake ports) 32 located within a sidewall of cylinder liner 18. In particular, as piston 24 moves downward within liner 18, a position will eventually be reached at which air intake ports 32 are no longer blocked by piston 24 and instead are fluidly communicated with combustion chamber 22. When air intake ports 32 are in fluid communication with combustion chamber 22 and a pressure of air at air intake ports 32 is greater than a pressure within combustion chamber 22, air will pass through air intake ports 32 into combustion chamber 22. It is contemplated that gaseous fuel (e.g. methane or natural gas), may be introduced into combustion chamber 22 (e.g. radially injected) through at least one of air intake ports 32. The gaseous fuel may mix with the air to form a fuel/air mixture within combustion chamber 22.

Eventually, piston 24 will start an upward movement that blocks air intake ports 32 and compresses the air/fuel mixture. As the air/fuel mixture within combustion chamber 22 is compressed, a temperature of the mixture may increase. At a point when piston 24 is near TDC, a liquid fuel (e.g. diesel or other petroleum-based liquid fuel) may be injected into combustion chamber 22 via a liquid fuel injector 36. The liquid fuel may be ignited by the hot air/fuel mixture, causing combustion of both types of fuel and resulting in a release of chemical energy in the form of temperature and pressure spikes within combustion chamber 22. During a first phase of the power/exhaust/intake stroke, the pressure spike within combustion chamber 22 may force piston 24 downward, thereby imparting mechanical power to crankshaft 30. At a particular point during this downward travel, one or more gas exchange ports (e.g., exhaust ports) 34 located within cylinder head 20 may open to allow pressurized exhaust within combustion chamber 22 to exit and the cycle will restart.

Liquid fuel injector 36 may be positioned inside cylinder head 20 and configured to inject liquid fuel into a top of combustion chamber 22 by releasing fuel axially towards an interior of cylinder liner 18 in a generally cone-shaped pattern. Liquid fuel injector 36 may be configured to cyclically inject a fixed amount of liquid fuel, for example, depending on a current engine speed and/or load. In one embodiment, engine 10 may be arranged to run on liquid fuel injections alone or a smaller amount of liquid fuel mixed with the gaseous fuel. The gaseous fuel may be injected through air intake port 32 into combustion chamber 22 via any number of gaseous fuel injectors 38. The gaseous fuel may be injected radially into combustion chamber 22 through a corresponding air intake port 32 after the air intake port 32 is opened by movement of piston 24.

Engine 10, utilizing fuel system 14, may consume two types of fuels when it is run as a dual-fuel engine. It is contemplated that the gaseous fuel may produce between 40% and 85% of a total energy output of engine 10. For example, the gaseous fuel may produce between 60% and 65% of the total energy output, with the liquid fuel producing the remaining 35% to 40%. In any case, the liquid fuel can act as an ignition source such that a smaller amount will be necessary than what is needed for engine 10 if it were running on only liquid fuel.

Figure 2:
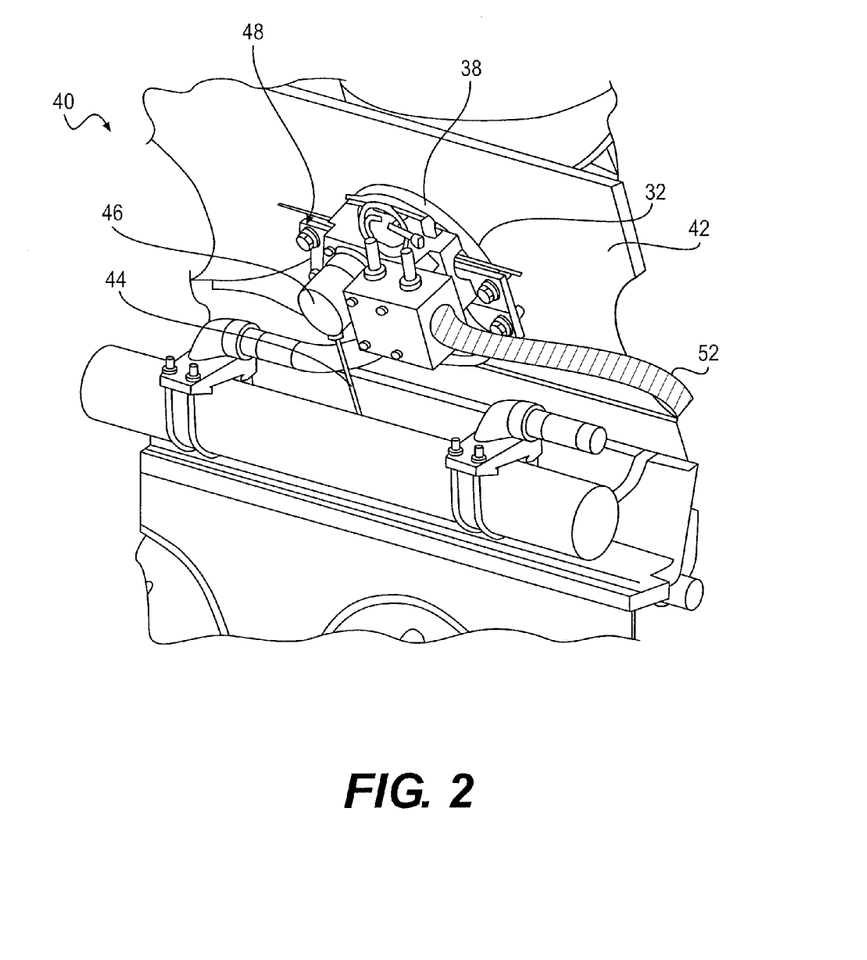
FIG. 2 is a pictorial illustration of an exemplary disclosed fuel injector that may be used in conjunction with the fuel system of FIG. 1.

FIG. 2 illustrates a cut-away view inside an air box 40 of engine 10, detailing an exemplary location of gaseous fuel injector 38. Gaseous fuel injector 38 may be positioned adjacent a wall 42 of engine block 12, such that a nozzle 54 (shown only in FIGS. 1, 3, and 4) of gaseous fuel injector 38 is in direct communication with one of air intake ports 32 of an adjacent engine cylinder 16. Gaseous fuel injector 38 may be connected at an opposing external end to power and control components of fuel system 14. These components may include, among other things, wiring 44 to supply electrical power, and a means to convert the electrical power into mechanical power, such as a solenoid 46. Mounting hardware 48 may include a mounting plate and bolts to mount gaseous fuel injector 38 to wall 42 or directly to cylinder liner 18 such that gaseous fuel injector 38 is positioned at an air intake port 32. Fuel system 14 may further include (i.e. in addition to liquid fuel injector 36, gaseous fuel injector 38, wiring 44, and solenoid 46) at least one fuel supply line 52 connected to gaseous fuel injector 38. Supply line 52 may be positioned inside air box 40 and be connected to a fuel supply 62 (shown schematically in FIG. 4) at a distal end. Fuel supply 62 may represent a fuel tank or other container configured to serve as a fuel reservoir. It is contemplated that fuel system 14 may further include a supply manifold 65 (shown schematically in FIG. 4), located within or outside of air box 40, that supplies gaseous fuel to multiple gaseous fuel injectors 38, if desired. Supply manifold 65 may be connected to a common flow regulator 64 (shown schematically in FIG. 4) for controlling the flow of fuel into supply manifold 65.

Figure 3:
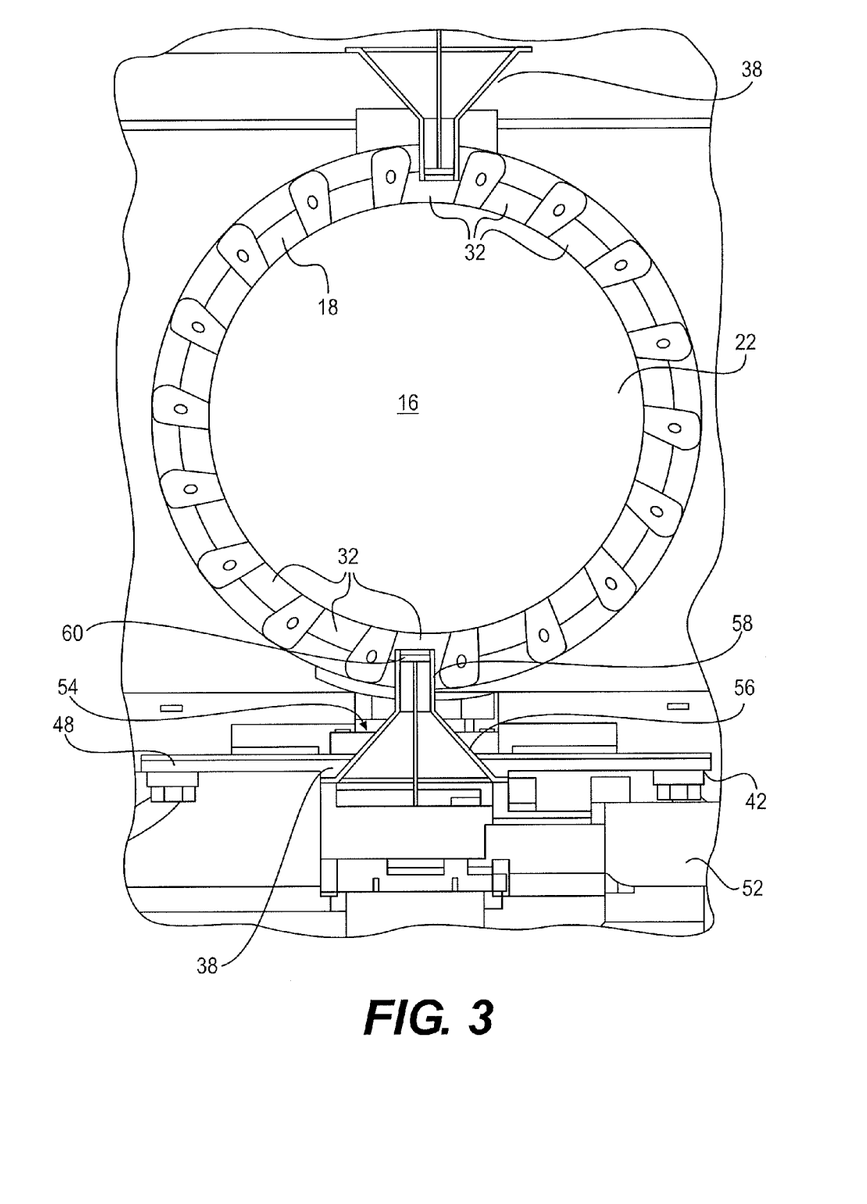
FIG. 3 is a top-view illustration inside of a cylinder of the engine of FIG. 1.

FIG. 3. illustrates a top view inside of cylinder 16. Cylinder 16 may include air intake ports 32 located circumferentially in cylinder liner 18. Each air intake port 32 may be angled to be offset from an associated radial direction 53 of cylinder 16. That is, an axis of air intake port 32 may not pass through an axis of cylinder 16. Air intake ports 32 may be arranged to direct air flow at an oblique horizontal angle of 18° with respect to associated radial direction 53. This orientation of air intake ports 32 may promote a counter-clockwise swirling flow of air from air box 40 into cylinder 16 (as viewed in FIG. 3), which may assist in mixing of the air with the fuel inside combustion chamber 22. Gaseous fuel injectors 38 may be placed in one or more of air intake ports 32 to inject fuel with this air flow.

Gaseous fuel injector 38 may include a nozzle 54, for example a converging nozzle having a converging portion 56 and a tip 58 connected at a distal end of converging portion 56. Tip 58 may create an axial flow path for gaseous fuel directed towards the center axis of cylinder 16. Converging portion 56 may increase upstream pressures of gaseous fuel to be injected into cylinder 16 through downstream tip 58. Converging portion 56 may have an included angle of approximately 60° relative to a center axis, with other angles in the range of about 50 to 70° possible. A pressure of injected gaseous fuel may be higher than that of the air inducted into cylinder 16 from air box 40. It is contemplated that the pressure of injected gaseous fuel may be approximately 2-4 bar greater than the inducted air. This pressure differential may be necessary to allow gaseous fuel to enter cylinder 16 during the time that air intake ports 32 are open and to overcome the flow of air from air box 40 through surrounding air intake ports 32. It is also possible for the higher pressure fuel to help pull air into the cylinder while air intake ports 32 are open.

As also shown in FIG. 3, gaseous fuel injector 38 may be angled differently than air intake port 32. In particular, gaseous fuel injector 38 may be oriented generally towards the axis of cylinder liner 18 or otherwise generally parallel to associated radial direction 53, at a horizontal first oblique angle with respect to air flow through air intake ports 32. Air intake ports 32 may be positioned to direct air flow at an oblique second horizontal angle of about 18° relative to associated radial direction 53. Alternatively, gaseous fuel injector 38 may be aligned with or perpendicular to the air flow direction of air intake ports 32. Tip 58 may be smaller than air intake port 32 such that it may be positioned at least partly in air intake port 32. Further, tip 58 may be located in an upper half of its associated air intake port 32 relative to the axial direction of cylinder liner 18 to allow for fuel injection even after piston 24 has begun to close a bottom portion of air intake ports 32. Gaseous fuel injector 38 may be positioned such that air may flow around nozzle 54, through the associated air intake port 32, and into cylinder 16. In another embodiment, the associated air intake port 32 may be sealed around nozzle 54 to prevent air flow through the same air intake port 32.

In some embodiments, multiple gaseous fuel injectors 38 may be associated with each cylinder 16. When multiple gaseous fuel injectors 38 are used, fuel injectors 38 may be positioned within generally opposing cylinder air intake ports 32, such that streams of fuel injected by these injectors 38 collide with each other inside of combustion chamber 22. For the purposes of this disclosure, the term "collide" may be interpreted as some degree of impact between the multiple streams of fuel, without regard to direction of the injections. To help ensure that opposing streams of fuel collide inside combustion chamber 22 at a general center of cylinder 16, fuel injectors 38 may be positioned within about 15° in either direction of being directly opposite each other. For example, fuel injectors 38 may be positioned within a range of about 165° to 195° from each other around a perimeter of cylinder 16. A resulting collision of two streams of fuel injected by injectors 38 may promote gaseous fuel retention and mixing inside cylinder 16. Fuel retention is an important consideration because the location of gaseous fuel injectors 38 inside air intake ports 32 could otherwise result in gaseous fuel being injected straight across combustion chamber 22 and out of an opposite air intake port 32. Utilization of multiple gaseous fuel injectors 38 may allow for fuel stream interactions that help to prevent gaseous fuel from escaping in this manner. Each gaseous fuel injector 38 may be connected to a common fuel source via a fuel supply line 52. Alternatively, each gaseous fuel injector 38 may be connected to separate fuel sources via separate fuel supply lines (not shown), if desired.

Further exemplary embodiments of fuel system 14 may include additional gaseous fuel injectors 38. For instance, a third gaseous fuel injector (not shown) may be positioned within a third air intake port 32 of cylinder 16 and be configured to inject additional gaseous fuel into combustion chamber 22. Gaseous fuel injectors 38 may be generally evenly spaced or staggered around cylinder 16 to create a desired colliding spray pattern. The injection of gaseous fuel from each gaseous fuel injector 38 may occur substantially simultaneously. Alternatively, gaseous fuel injectors 38 may be configured to inject at different times, such that an injection from one injector 38 begins after the injection from another fuel injector 38 has already begun. Further, one fuel injector 38 may inject a larger quantity of fuel than another fuel injector 38 during a given cycle. One of ordinary skill in the art would recognize that other quantities and arrangements of multiple gaseous fuel injectors 38 may be possible.

In some embodiments, a blocking member 60 may be disposed at a distal end of tip 58 to help keep the tip end clear of foreign objects and debris while allowing free flow of gaseous fuel from gaseous fuel injector 38. In an exemplary embodiment, blocking member 60 is a coalescing filter that allows gaseous fuel to flow freely into cylinder 16 while inhibiting other materials, such as lubricant and combustion by-products from entering injector 38. Gaseous fuel injector 38 may be arranged to inject gaseous fuel at a velocity capable of dislodging materials gathered on a face of the coalescing filter off of blocking member 60 and into cylinder 16. Blocking member 60 may alternatively be another type of mechanism that allows flow out of nozzle 54 and prevents flow into it, such as a passive reed valve. It is also contemplated that blocking member 60 may incorporate both a coalescing filter and a reed valve, if desired.

Blocking member 60 may be placed either at an outer edge of or inside tip 58. In either instance, blocking member 60 may be placed in the axial flow path created by tip 58. Blocking member 60 may include an inner face oriented toward converging portion 56 of nozzle 54 and an oppositely disposed outer face oriented toward combustion chamber 22. Blocking member 60 may include at least one aperture for allowing gaseous fuel to pass through. In addition, blocking member 60 may be placed such that the inner face is substantially perpendicular to the axial flow path of the gaseous fuel, such that gaseous fuel may not be required to change direction as it passes from the inner face to the outer face, through blocking member 60. Materials from inside of combustion chamber 22 may gather on the outer face of blocking member 60.

Figure 4:
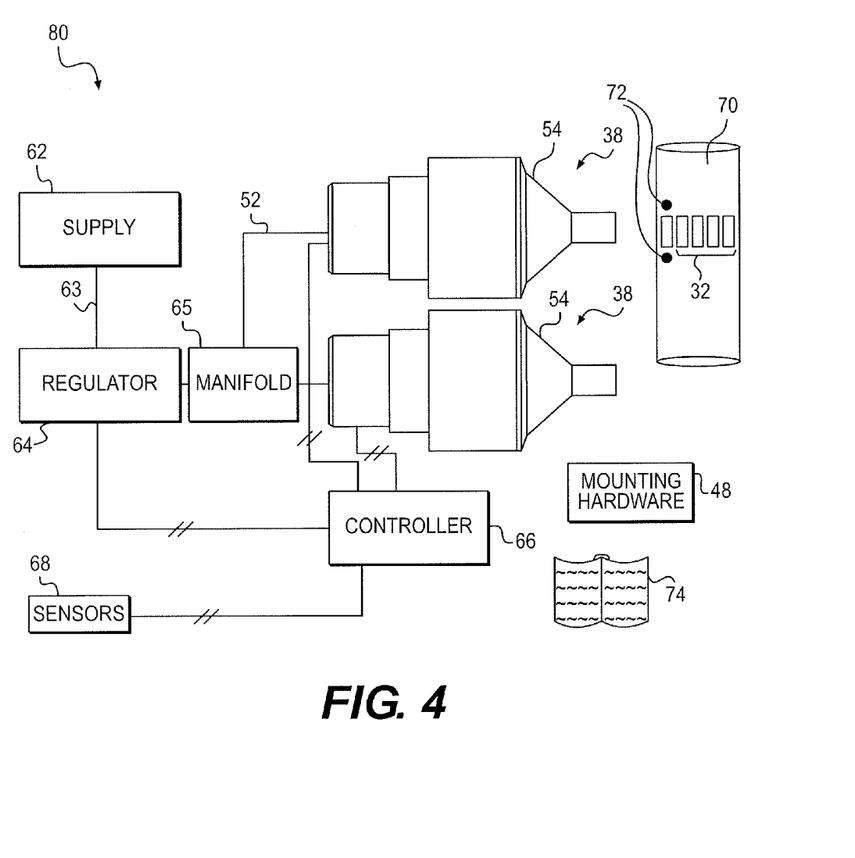
FIG. 4 is a schematic illustration of an exemplary disclosed fuel system retrofit kit that may be used in conjunction with the engine of FIG. 1.

FIG. 4 schematically illustrates the components of an exemplary fuel system retrofit kit 80 for engine 10. Retrofit kit 80 may include the components necessary to convert an existing single-fuel (e.g. diesel-only) engine into the dual-fuel engine that has been described above. Retrofit kit 80 may include, among other things, one or more gaseous fuel injectors 38, each including a nozzle 54. One or multiple gaseous fuel injectors 38 may be associated with each cylinder 16. A fuel supply 62, a common fuel supply line 63, a common flow regulator 64, a supply manifold 65, and individual injector fuel supply lines 52 may be included in retrofit kit 80. Control components, including controller 66 and sensors 68, may also be included in kit 80. It is contemplated that sensors 68 may represent one or more performance sensors (e.g. temperature, pressure, and/or knock sensors) configured to generate a signal indicative of a performance condition of the engine after conversion of the engine to run on two different fuels and relay that signal to controller 66. Controller 66 may be capable of further communicating with common flow regulator 64, and/or an existing liquid fuel injector.

Retrofit kit 80 may additionally include one or more replacement cylinder liners 70 that have pre-drilled holes 72 for receiving mounting hardware 48 (e.g. bolts) that mount gaseous fuel injectors 38 at air intake ports 32, either inside air box 40 to wall 42 or directly to cylinder liner 18. Mounting hardware 48 may further include a mounting plate for positioning a gaseous fuel injector 38. If a mounting plate is included, it may include holes for allowing air to flow through, to help prevent mounting hardware 48 from blocking air flow through air intake ports 32. A set of instructions 74 for properly installing the components of kit 80 may also be included. One of ordinary skill in the art would recognize that retrofit kit of FIG. 4 represents an exemplary kit for converting a single fuel engine and that additional and/or different combinations of components may be necessary to complete the conversion of a given engine.

Figure 5:
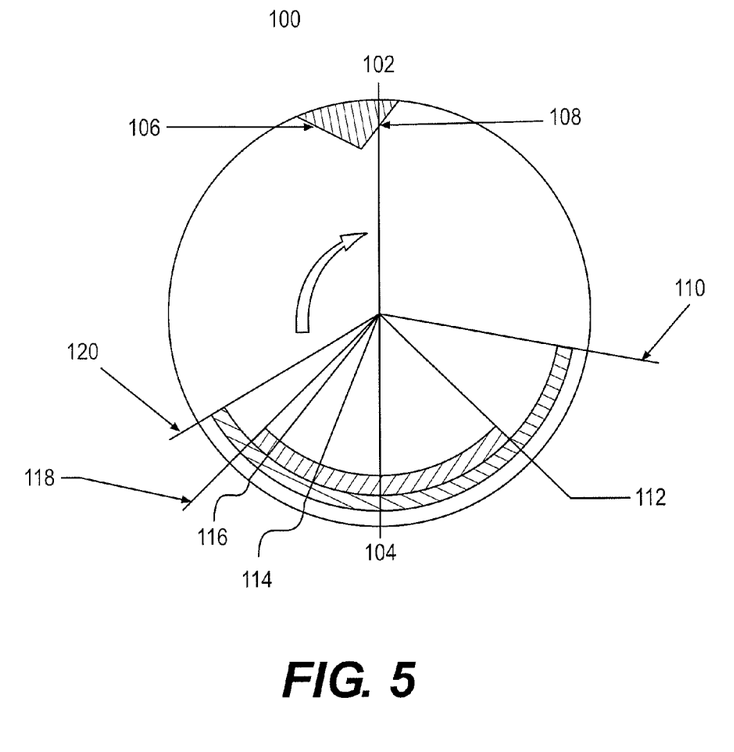
FIG. 5 is an exemplary disclosed timing diagram associated with the operation of the fuel system of FIG. 1.

FIG. 5 illustrates a timing diagram of an exemplary dual-fuel engine. FIG. 5 will be discussed in detail in the following section to further illustrate the disclosed concepts.

INDUSTRIAL APPLICABILITY

Fuel system 14 may be used in a new dual-fuel engine or retrofitted into an existing single-fuel engine. Fuel system 14 may be a substitute for a single fuel system in order to utilize the associated engine in a cleaner and more cost-efficient manner.

FIG. 5 is an exemplary timing diagram 100 associated with operation of engine 10 and fuel system 14. As seen in FIG. 5, liquid fuel may be injected into combustion chamber 22 during a time period near TDC 102, between a liquid fuel injection starting point 106 and a liquid fuel injection ending point 108. As piston 24 moves towards BDC 104 on its power/exhaust/intake stroke, exhaust ports 34 may be opened near a point 110. Piston 24 may continue downwardly until piston crown 26 begins to uncover air intake ports 32 at a corresponding point 112 in FIG. 5. Once piston crown 26 passes the bottom of air intake ports 32, ports 32 may be fully open. Gaseous fuel may be injected from gaseous fuel injector 38 during a time period between corresponding points 114 and 116 while air intake ports 32 are open. As piston 24 moves upwardly from BDC 104, piston crown 26 will gradually close air intake ports 32. Air intake ports 32 may be completely closed at a point 118. All gaseous fuel injection may occur before this point is reached. It is contemplated that gaseous fuel will be injected during about 25% to 40% of the full time period between 112 and 118 in which air intake ports 32 are open. In one embodiment, this injection time (between 114 and 116) occurs only during the second half of this time period, when piston 24 is in its intake/compression stroke. After gaseous fuel is injected and intake ports 32 are closed, exhaust ports 34 may close near a point 120. Before reaching TDC 102, liquid fuel injection may start at point 106. As piston 24 finishes its compression stroke, the injected liquid fuel may cause combustion of the overall fuel mixture, restarting the cycle.

The use of opposing gaseous fuel injectors 38 may contribute to greater fuel retention of gaseous fuel inside of cylinder 16 since streams of gaseous fuel injected by each gaseous fuel injector 38 may collide with each other near a center of combustion chamber 22. This collision may prevent the fuel from travelling directly across combustion chamber 22 and out of an opposing air intake port 32 and into air box 40. The resulting fuel interaction may also assist in mixing the gaseous fuel with the intake air inside cylinder 16 by dispersing the fuel throughout combustion chamber 22. Further, the use of multiple gaseous fuel injectors 38 may allow for greater control of the fuel being injected. With multiple gaseous fuel injectors 38, more gaseous fuel may be injected during a shorter period of time, which may be advantageously utilized to inject closer to the end of the period in which air intake ports 32 are open. This also may further promote more efficient fuel retention.

It will be apparent to those skilled in the art that various modifications and variations can be made to the disclosed engine and fuel system. Other embodiments will be apparent to those skilled in the art from consideration of the specification and practice of the disclosed fuel system. It is intended that the specification and examples be considered as exemplary only, with a true scope being indicated by the following claims and their equivalents.

What is claimed is:

1. A fuel system for an engine comprising:
   a plurality of air intake ports circumferentially spaced around a cylinder and fluidly connecting an air box with a combustion chamber, the plurality of air intake ports including at least a first air intake port, a second air intake port, and a third air intake port; and
   a plurality of gaseous fuel injectors each configured to inject gaseous fuel in the combustion chamber, the plurality of gaseous fuel injectors including:
   a first gaseous fuel injector positioned adjacent to the first air intake port and configured to inject a first stream of gaseous fuel radially into the combustion chamber of the cylinder through the first air intake port; and
   a second gaseous fuel injector positioned adjacent to the second air intake port and configured to inject a second stream of gaseous fuel radially into the combustion chamber through the second air intake port to collide with the first stream of gaseous fuel,
   wherein the first, second, and third air intake ports are each configured to be opened and closed by movement of a piston inside the cylinder.

2. The fuel system of claim 1, wherein the first and second fuel injectors are spaced generally opposite from each other around the cylinder.

3. The fuel system of claim 2, wherein the first and second fuel injectors are spaced within 15° of directly opposite each other around the cylinder.

4. The fuel system of claim 1, wherein the gaseous fuel contributes about 40-85% of a total energy produced by fuel combustion inside the cylinder.

5. The fuel system of claim 4, wherein the gaseous fuel contributes about 60-65% of the total energy produced by fuel combustion.

6. The fuel system of claim 1, wherein:
   the first gaseous fuel injector is oriented generally towards a center of the cylinder, angled with respect to an orientation angle of the first air intake port; and
   the second gaseous fuel injector is oriented generally towards the center of the cylinder, angled with respect to an orientation angle of the second air intake port.

7. The fuel system of claim 6, wherein the orientation angle of each of the first and second air intake ports is approximately 18° with respect to an associated radial direction.

8. The fuel system of claim 1, wherein the gaseous fuel is natural gas.

9. The fuel system of claim 1, further including a liquid fuel injector configured to inject liquid fuel axially into the combustion chamber.

10. A method of injecting fuel into an engine comprising:
    injecting a first stream of gaseous fuel radially into a combustion chamber of a cylinder of the engine through a first air intake port; and
    injecting a second stream of gaseous fuel radially into the combustion chamber through a second air intake port to collide with the first stream of gaseous fuel,
    wherein injecting the first and second streams of gaseous fuel includes injecting the gaseous fuel for about 25% to 50% of the time period during which the first and second air intake ports are open.

11. The method of claim 10, further including injecting liquid fuel axially into the combustion chamber.

12. The method of claim 10, wherein injecting the first and second streams of gaseous fuel includes injecting the gaseous fuel during a second half of the time period during which the first and second air intake ports are open.

13. The method of claim 10, wherein injecting the first and second streams of gaseous fuel includes injecting the first stream of gaseous fuel and the second stream of gaseous fuel substantially simultaneously.

14. The method of claim 10, wherein injecting the first and second streams of gaseous fuel includes beginning to inject the second stream of gaseous fuel after beginning to inject the first stream of gaseous fuel.

15. The method of claim 10, wherein injecting the first and second streams of gaseous fuel includes injecting substantially equal quantities of gaseous fuel.

16. The method of claim 10, wherein injecting the first and second streams of gaseous fuel includes injecting a greater quantity of fuel with the first stream of gaseous fuel than with the second stream of gaseous fuel.

17. The method of claim 10, wherein the gaseous fuel contributes about 40-85% of a total energy produced by fuel combustion inside the cylinder.

18. The method of claim 17, wherein the gaseous fuel contributes about 60% to 65% of the total energy produced by fuel combustion.

19. An engine comprising:
    an engine block defining a plurality of cylinders;
    an air box connected to a side of the engine block;
    a cylinder liner disposed in each of the plurality of cylinders and having a plurality of air intake ports circumferentially spaced around the cylinder liner, the plurality of air intake ports including at least a first air intake port, a second air intake port, and a third air intake port;

a cylinder head associated with each of the plurality of cylinders;

a piston disposed within each of the plurality of cylinders;

a combustion chamber at least partially defined by the cylinder liner, the cylinder head, and the piston, wherein the combustion chamber is fluidly connected to the air box by the plurality of air intake ports; and a plurality of gaseous fuel injectors each configured to inject gaseous fuel in the combustion chamber, the plurality of gaseous fuel injectors including:

a first gaseous fuel injector positioned adjacent to the first air intake port and configured to inject a first stream of gaseous fuel radially into the combustion chamber through the first air intake port; and a second gaseous fuel injector positioned adjacent to the second air intake port and configured to inject a second stream of gaseous fuel radially into the combustion chamber through the second air intake port to collide with the first stream of gaseous fuel, wherein the first, second, and third air intake ports are each configured to be opened and closed by movement of the piston inside the cylinder.

20. The fuel system of claim 1, wherein at least the third air intake port is configured to allow air to flow directly from the air box into the combustion chamber.

* * * * *